Jan. 20, 1953

L. W. ALVAREZ 2,626,352

PULSE DISCRIMINATING CIRCUIT

Original Filed March 18, 1943

INVENTOR
LUIS W. ALVAREZ

BY *M. A. Hayes*

ATTORNEY

Patented Jan. 20, 1953

2,626,352

UNITED STATES PATENT OFFICE 2,626,352

PULSE DISCRIMINATING CIRCUIT

Luis W. Alvarez, Berkeley, Calif., assignor, by mesne assignments, to the United States of America as represented by the Secretary of the Navy Original application March 18, 1943, Serial No. 479,625, now Patent No. 2,568,265, dated September 18, 1951. Divided and this application August 15, 1949, Serial No. 110,295

2 Claims. (Cl. 250—27)

This invention relates to radio beacon systems which are normally inoperative but which may be fired from a remote point by radio signals, and more particularly to a pulse discriminating circuit for use in the receiver of a beacon system whereby the beacon will be fired only when it receives a signal of a predetermined character.

This application is a division of my co-pending application Serial No. 479,625, filed March 18, 1943, entitled "Radio Beacon and System Utilizing It," now Patent No. 2,568,265, issued September 18, 1951.

The principal object of the present invention is to provide a circuit which is operative only upon application thereto of a signal of a predetermined character.

Another object of the invention is to provide a pulse discriminating circuit.

Figure 1:
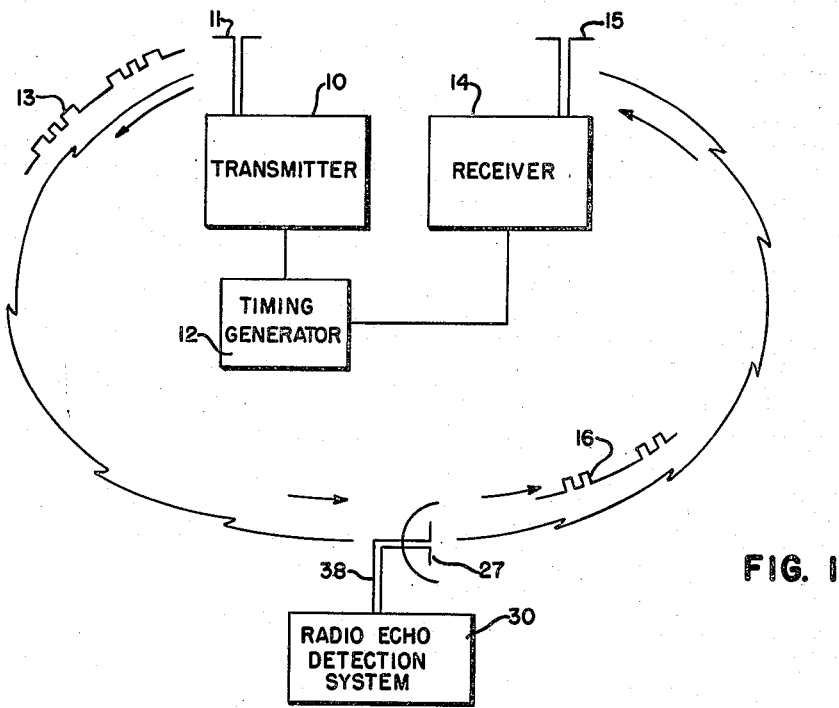
Figure 2:
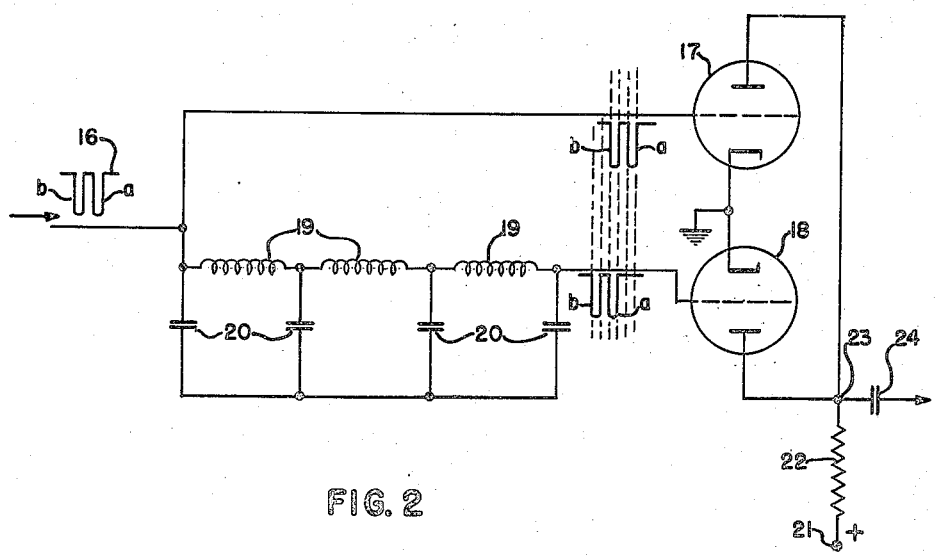

These and other objects of the invention will become apparent from the following detailed description when considered with the accompanying drawings in which:

Fig. 1 is a block diagram of a beacon system in which the circuit of the invention finds particular application; and Fig. 2 is a circuit diagram of the discriminating circuit of the present invention.

Referring now to Fig. 1, a beacon system in which the circuit of the present invention may be utilized is shown as comprising a transmitter 10 which is provided with a suitable antenna 11 for radiating electromagnetic oscillations, which are preferably in the microwave region. A timing generator 12 is connected to the transmitter and is arranged to modulate the oscillations produced thereby in a predetermined manner so that a coded signal may be radiated from the antenna. For purposes of illustration, the signal modulated upon the carrier waves has been indicated at 13 as two long pulses with a short pulse in between them, represented by the letter K in the International Morse Code, and these pulses are fast enough so that the total time of the coded signal will be in the order of 100 microseconds. However, since this signal and the means for generating it do not form a part of the present invention, they will not further be described herein.

A receiver 14 which is connected to the timing generator 12 is also supplied with an antenna 15 whereby it may pick up signals broadcast from some remote point as, for example, from the transmitter of a radio echo detection system 30 which may be located on a moving craft at some remote point. This remote system is preferably provided with a directional antenna 27, mounted for rotation on the rotating structure 38. The receiver 14 is arranged to respond only to signals of a predetermined character, as for instance, double pulse modulation, as indicated at 16, the carrier frequency being the frequency to which the receiver 14 is tuned. The response of the receiver is used to control the transmitter 10 whereby the latter is only operating immediately after the reception by the receiver of one of the double pulses 16 and then in a manner and for a period of time sufficient only to radiate the coded signal 13 after which the transmitter is shut off. Therefore, when a double pulse at the proper carrier wave frequency is picked up by the receiver 14, it fires the transmitter 10, radiating a single coded signal, as determined by the timing generator 12.

Referring now to Fig. 2, a discriminating circuit for causing the receiver 14 to respond only to the double pulse 16 is illustrated. This circuit comprises two tubes 17 and 18 upon the grid circuits of which the double pulse 16 is applied, preferably in an inverted form as indicated, so that the signal received on the grids is negative. This negative double pulse is applied directly to the grid of the tube 17, but the grid of the tube 18 is provided with a delay circuit which includes inductances 19 and condensers 20. The values of inductances 19 and condensers 20 are so chosen that the signal reaching the grid of the tube 18 will be delayed a time interval equal to the time between individual pulses of the double pulse signal. When the values of these components are properly chosen, the first portion $a$ of the double pulse will reach the grid of the tube 17 before the first portion $a$ reaches the grid of the tube 18. The portion $b$ of the double pulse will reach the grid of the tube 17 at exactly the same time that the portion $a$ will reach the grid of the tube 18 so that at this instant both grids are driven negatively, that of the tube 17 by the portion $b$ of the pulse and that of the tube 18 by the portion $a$ of the pulse.

The cathodes of the tubes 17 and 18 are connected to ground, as indicated, and the anodes are connected together and to a source of positive potential, indicated at 21, through a resistor 22, the value of which is high as compared to the internal resistances of the tubes 17 and 18. A point 23 at the anode end of the resistor is then connected through the condenser 24 to the control circuit for the transmitter 10.

In the operation of the circuit, both tubes 17 and 18 are normally conductive. The point 23, therefore, will be at some potential less than the point 21 depending on the value of the resistor 22. Since the value of resistor 22 is high as compared to the internal resistances of the tubes 17 and 18, as long as either one tube or the other is conducting, the point 23 will remain at about the same potential, but, as soon as sufficiently strong signals are received to cause both tubes to shut off together by the simultaneous application of the negative portion $b$ of the double pulse on the grid of the tube 17 and the negative portion $a$ of the double pulse on the grid of the tube 18, current ceases to flow through resistor 22 and point 23 is raised to the potential of point 21. Thus a positive potential is delivered through the condenser 24 to the control circuit.

Any combination of pulses which will cause the tubes 17 and 18 alternately to shut off will not deliver a positive pulse to the next stage; but as soon as a strong enough signal of the proper character to permit the tubes of both grids 17 and 18 to be driven negatively at the same time is received, the current through the resistor 22 is shut off and the point 23 is driven in a positive direction. The double pulse indicated does not have to be used, since a single pulse having a greater time interval than the time delay of the grid circuit of tube 18 will also be capable of shutting off both tubes simultaneously.

Although the circuit of the present invention has been described as being incorporated in a beacon system, it will be appreciated that it may also have application elsewhere. Accordingly, the foregoing description should not be construed as definitive of the invention but merely illustrative of a possible application thereof. The spirit and scope of the invention is to be limited only by the appended claims.

What is claimed is:

1. A circuit for producing an output signal only upon application thereto of a pair of pulses having a predetermined time interval therebetween comprising, first and second electron tubes each having an anode, a cathode and a control grid, a source of anode potential for said tubes, a common anode resistor connected between the anodes of said tubes and said source of anode potential, said tubes being normally conductive and said resistor being of a value to produce a potential increase at said anodes only when both of said tubes are cut off simultaneously first and second means for applying pulse signals of negative polarity and the same wave form to the control grids of said first and second tubes, respectively, said first means comprising a conductor and said second means comprising a delay line having a delay time equal to said predetermined time interval.

2. A circuit for producing an output signal only upon application thereto of an input pulse of greater duration than a predetermined time comprising, a pair of electron tubes each having at least an anode, a cathode and a control grid, means connecting the cathodes of said tubes together, a source of anode potential, a common load resistor connected between the anodes of said tubes and said source of anode potential, said tubes both being normally conductive and said resistor being of a value to produce a potential increase at the junction of said resistor and said anodes only when both tubes are simultaneously cut off, a conductor for applying said input pulses with negative polarity directly to the control grid of one of said tubes, and a delay line for applying said input pulses to the grid of the other tube with negative polarity and delayed relative to the application of said pulses to said one tube by an amount equal to said predetermined time.

LUIS W. ALVAREZ.

REFERENCES CITED

The following references are of record in the file of this patent:

UNITED STATES PATENTS

| Number | Name | Date |
| --- | --- | --- |
| 2,252,599 | Lewis | Aug. 12, 1941 |
| 2,406,882 | Young | Sept. 3, 1946 |
| 2,437,313 | Bedford | Mar. 9, 1948 |
| 2,522,609 | Gloess | Sept. 19, 1950 |